United States Patent
Roh

(10) Patent No.: US 10,929,371 B2
(45) Date of Patent: *Feb. 23, 2021

(54) SYSTEM AND METHOD FOR SUPPORTING CONTACT REMINDING

(71) Applicant: SK PLANET CO., LTD., Seongnam-si (KR)

(72) Inventor: Hai Gang Roh, Seoul (KR)

(73) Assignee: SK PLANET CO., LTD., Seongnam-si (KR)

(*) Notice: Subject to any disclaimer, the term of this patent is extended or adjusted under 35 U.S.C. 154(b) by 559 days.

This patent is subject to a terminal disclaimer.

(21) Appl. No.: 15/805,820

(22) Filed: Nov. 7, 2017

(65) Prior Publication Data

US 2018/0060372 A1   Mar. 1, 2018

Related U.S. Application Data

(63) Continuation of application No. 14/406,432, filed as application No. PCT/KR2013/006577 on Jul. 23, 2013, now Pat. No. 9,842,131.

(30) Foreign Application Priority Data

Sep. 4, 2012 (KR) .................. 10-2012-0097499
Sep. 6, 2012 (KR) .................. 10-2012-0098708

(51) Int. Cl.
*G06F 16/23* (2019.01)
*G06F 16/13* (2019.01)
(Continued)

(52) U.S. Cl.
CPC .............. *G06F 16/23* (2019.01); *G06F 16/13* (2019.01); *G06F 16/2462* (2019.01);
(Continued)

(58) Field of Classification Search
CPC ....................................................... H04L 61/15
(Continued)

(56) References Cited

U.S. PATENT DOCUMENTS

2005/0065855 A1   3/2005 Geller
2005/0262035 A1*  11/2005 Itabashi .............. H04L 12/2809
(Continued)

FOREIGN PATENT DOCUMENTS

KR    1020110074059 A    6/2011
KR    1020110088707 A    8/2011
(Continued)

OTHER PUBLICATIONS

International Search Report for PCT/KR2013/006577 dated Nov. 29, 2013.
(Continued)

*Primary Examiner* — Baoquoc N To
(74) *Attorney, Agent, or Firm* — Fenwick & West LLP

(57) ABSTRACT

The present invention relates to a system and method for supporting contact reminding and includes: a contact history database for storing information on a contact history; an unregistered contact point obtaining unit for obtaining an unregistered contact point which has not been registered with an address database, based on the contact history stored in the contact history database; and a contact point recommending unit for calculating contact statistics for a preset certain period by using the contact histories of the obtained unregistered contact points, determining, as a recommended contact point, an unregistered contact point from which contact has not been received recently, based on the calculated contact statistics of the unregistered contact points and the number of times that contact has been made for a recent certain period, and informing a user of the determined recommended contact point.

9 Claims, 5 Drawing Sheets

(51) Int. Cl.
   *G06F 16/2458* (2019.01)
   *G06Q 10/10* (2012.01)
   *H04W 4/00* (2018.01)
(52) U.S. Cl.
   CPC ............ *G06Q 10/109* (2013.01); *H04W 4/00* (2013.01); *G06Q 10/101* (2013.01)
(58) Field of Classification Search
   USPC ........................................................ 707/613
   See application file for complete search history.

(56) References Cited

U.S. PATENT DOCUMENTS

| | | |
|---|---|---|
| 2007/0198281 A1 | 8/2007 | Abernethy, Jr. et al. |
| 2008/0270939 A1 | 10/2008 | Mueller |
| 2010/0325633 A1 | 12/2010 | Eguro et al. |
| 2011/0078585 A1 | 3/2011 | King et al. |
| 2011/0258159 A1 | 10/2011 | Mitchell |
| 2011/0288868 A1 | 11/2011 | Lloyd et al. |
| 2012/0150921 A1* | 6/2012 | Yamakawa ......... G06F 21/6245 707/805 |
| 2012/0159021 A1 | 6/2012 | Anantha Padmanaban et al. |
| 2014/0008459 A1* | 1/2014 | Wright ................... B05B 3/002 239/251 |
| 2014/0068459 A1 | 3/2014 | Graham |

FOREIGN PATENT DOCUMENTS

| | | |
|---|---|---|
| KR | 1020120032632 A | 4/2012 |
| KR | 1020120101238 A | 9/2012 |

OTHER PUBLICATIONS

European Search Report dated Mar. 21, 2016 for European Patent Application No. 13835609.2.

* cited by examiner

SYSTEM AND METHOD FOR SUPPORTING CONTACT REMINDING

CROSS REFERENCE TO RELATED APPLICATION

The present application is a continuation of the U.S. patent application Ser. No. 14/406,432, filed on Dec. 8, 2014, which is a U.S. National Phase Entry of International Patent Application No. PCT/KR2013/006577 filed Jul. 23, 2013, which is based upon and claims the benefit of priority to Korean Patent Application No. 10-2012-0097499, filed on Sep. 4, 2012 and Korean Patent Application No. 10-2012-0098708, filed on Sep. 6, 2012. The disclosures of the above-listed applications are hereby incorporated by reference herein in their entirety.

TECHNICAL FIELD

The present invention relates to a system and method for supporting contact reminding and, more particularly, to a system and method for supporting contact reminding, wherein pieces of unregistered contact information not registered with a directory database are obtained based on a contact history stored in a contact history database, a contact statistics value for a predetermined, specific period is calculated using the contact histories of the pieces of obtained unregistered contact information, contact information that has recently been loosely connected is determined to be recommendation contact information based on the contact statistics values of the pieces of unregistered contact information and the number of times of contacts for a recent specific period, and getting in touch is recommended for a user based on the recommendation contact information.

BACKGROUND ART

In modern people, personal relationship management ability becomes an important item comparable to his or her job performance. Accordingly, most people are making an effort to form and maintain a human network through various methods. Recently, remarkably developed wired/wireless communication technologies aid in forming wider human relations as compared to a prior art.

For example, there is a method using a mobile communication terminal. A mobile communication terminal is advantageous in that deeper intimacy with a counterpart can be formed using the mobile communication terminal because the mobile communication terminal can be carried at any time, and anywhere without being limited to a place and an immediate reaction from the counterpart can be expected.

However, in order to maintain a continuing relationship with people stored in the telephone directory of a mobile communication terminal, the user of the mobile communication terminal has to search the telephone directory for persons with who calls or contacts are loosely made and to make phone calls or send messages to the persons. In such a case, if there is a record that a phone call has recently been made or messages have recently been transmitted and received, whether contact has been made may be checked through a recent call list or a message storage box. However, persons capable of being checked are very limited because the storage capacity of the mobile communication terminal is limited, and much time and effort are required.

Accordingly, there will be a need for research into a method capable of actively and efficiently using a mobile communication terminal in maintaining personal relations by consistently checking the level of closeness with counterparts stored in the telephone directory of the mobile communication terminal.

Furthermore, there are problems in that a user does not frequently register the contact information of acquaintances with a terminal directory because it is inconvenient for the user to manually store the contact information of the acquaintances in the directory one by one and thus the user is unable to make contact with acquaintances not registered with the directory.

Furthermore, with the recent rapid supply of portable phones and mobile communication terminals, users frequently change their telephone numbers into new telephone numbers.

For convenience of a user having a changed telephone number, a communication service provider provides service in which an incoming call switches to the changed telephone number of the user when a counterpart makes a phone call to the pervious telephone number of the user or provides service in which a counterpart is notified of the changed telephone number of the user through voice or a text message for a specific period when the counterpart makes a phone call to the previous telephone number.

Furthermore, a user directly notifies acquaintances (counterparts) that his or her telephone number has been changed one by one through voice call or text messages.

However, such a method is inconvenient for a counterpart because the counterpart has to check the changed telephone number of the user and to update the telephone number of the user, stored in the directory of a mobile communication terminal, with the changed telephone number by manually manipulating his or her own mobile communication terminal.

DISCLOSURE

Technical Problem

The present invention has been made to solve the aforementioned problems, and an object of the present invention is to provide a system and method for supporting contact reminding, wherein the contact statistics value of each of pieces of unregistered contact information, not registered with a directory, for a specific period is calculated based on a contact history, pieces of unregistered contact information that have recently been loosely connected are extracted based on the contact statistics values, and getting in touch is recommended for a user.

Another object of the present invention is to provide a system and method for supporting contact reminding, wherein a user terminal or a contact reminding support apparatus is capable of recommending the contact information of loosely connected acquaintances to a user periodically or according to user setting based on the contact history of the user so that the user gets in touch with the loosely connected acquaintances.

Yet another object of the present invention is to provide a system and method for supporting contact reminding, which are capable of automatically sending a hello message to unregistered contact information that belongs to pieces of unregistered contact information not registered with a directory database and that is loosely connected for a recent specific period.

Further yet another object of the present invention is to provide a directory management system and method, which are capable of automatically updating additional user information, such as the birthdays, hobbies, approval for scheduling sharing, base areas, and photos of acquaintances registered with a terminal directory, although a user does not directly input the birthdays, hobbies, approval for scheduling sharing, base areas, and photos.

Further yet another object of the present invention is to provide a directory management system and method, which are capable of synchronizing information about the directory of a user terminal with information about the directory of a directory management apparatus.

Further yet another object of the present invention is to provide a directory management system and method, which are capable of minimizing inconvenience that is caused when a user makes voice calls or sends text messages to acquaintances one by one in order to notify the acquaintances of additional user information.

Technical Solution

In accordance with an aspect of the present invention, there is provided a contact reminding support apparatus, including a contact history database in which contact history information is stored, an unregistered contact information acquisition unit which obtains pieces of unregistered contact information not registered with a directory database based on contact histories stored in the contact history database, and a contact information recommendation unit which calculates contact statistics values for a predetermined, specific period using the contact histories of the pieces of obtained unregistered contact information, determines contact information that has recently been loosely connected to be recommendation contact information based on the contact statistics values of the pieces of unregistered contact information and the number of times of contacts for a recent specific period, and notifies a user of the determined and recommended contact information.

The contact history database may store pieces of user identification information and contact history information including at least one of contact information of each of counterparts who have gotten in touch with each of the pieces of user identification information, a contact date, call time, the number of messages transmitted and received, and the number of e-mails transmitted and received with each of the pieces of the contact information.

The unregistered contact information acquisition unit may remove unregistered contact information, corresponding to at least one of call center contact information, cut-off contact information, blacklist contact information, and spam contact information, from the pieces of obtained unregistered contact information and obtain pieces of remaining unregistered contact information.

The contact recommendation unit may calculate at least one of a total number of calls, a total call time, a total number of messages transmitted and received, a total number of e-mails transmitted and received, and a combination of the total number of calls, the total call time, the total number of messages, and the total number of e-mails which have been performed between the user and each of the pieces of unregistered contact information for a predetermined, specific period, as the contact statistics value.

Furthermore, the contact recommendation unit may arrange the pieces of unregistered contact information in order of a higher contact statistics value, may check contact histories of a specific number of pieces of unregistered contact information for a recent specific period that have been arranged at a higher place, and may determine pieces of unregistered contact information each having the number of times of contacts less than a predetermined number to be the recommendation contact information, or may obtain pieces of unregistered contact information each having a contact statistics value equal to or higher than a predetermined value, may check the contact histories of the pieces of obtained unregistered contact information for a recent specific period, and may determine pieces of unregistered contact information having the number of times of contacts less than a predetermined number to be the recommendation contact information.

Furthermore, the contact recommendation unit may obtain personal information of the user of the recommendation contact information from the directory management apparatus, may generate a contact recommendation message including at least one of the obtained personal information, the recommendation contact information, and a contact statistics history related to the recommendation contact information, and may send the contact recommendation message to a user terminal, or may generate contact recommendation notification information including at least one of the obtained personal information, the recommendation contact information, and a contact statistics history related to the recommendation contact information and output the contact recommendation notification information.

Furthermore, the contact recommendation unit may automatically send a hello message, previously written by the user, to the determined and recommended contact information.

In accordance with another aspect of the present invention, there is provided a directory management apparatus, including a communication unit for communication with a user terminal, a directory database in which directory information of the user terminals is stored, an additional user information processing unit which obtains pieces of acquaintance identification information of the user terminal by searching the directory database when an additional user information request signal is received from the user terminal through the communication unit, sends an additional user information request message to the pieces of obtained acquaintance identification information, and receives additional user information responses, and a directory update processing unit which extracts acquaintance identification information and additional user information by analyzing each of the received additional user information responses, updates directory information of the user terminal by storing the extracted additional user information in corresponding acquaintance identification information of the directory database, and sends a directory update notification signal to the user terminal.

The directory management apparatus may further include a directory information providing unit which obtains the directory information of the user terminal from the directory database when a directory update request signal is received through the communication unit and provides the obtained directory information.

The additional user information processing unit may send a message of a question and answer form that requests at least one of a birthday, hobbies, an address, photos, and whether schedules will be shared or information about the URL of the directory management apparatus as the additional user information request message.

The directory update processing unit may extract other user terminals in which acquaintances whose additional user information has been updated have been registered as acquaintances by searching the directory database and send the directory update notification signal to the extracted other user terminals.

In accordance with yet another aspect of the present invention, there is provided a user terminal, including a communication unit for communication with a directory management apparatus, a user interface unit, a storage unit in which a terminal directory is stored, an additional user information request processing unit which sends an additional user information request signal, including terminal identification information, to the directory management apparatus when an additional user information request command is received through a directory management application, and a directory update unit which sends a directory update request signal to the directory management apparatus when a directory update notification signal is received from the directory management apparatus, receives updated directory information from the directory management apparatus, and updates the terminal directory stored in the storage unit.

The user terminal may further include an additional user information response processing unit which receives an additional user information response through the user interface unit when an additional user information request message is received is received from the directory management apparatus through the communication unit and sends the additional user information response to the directory management apparatus.

If the additional user information request message is a message of a question and answer form, the user terminal may receive a response to questions through the user interface unit and send the response to the directory management apparatus. If the additional user information request message includes information about the URL of the directory management apparatus, the user terminal may access the directory management apparatus through the information about the URL and write a response to questions.

In accordance with another aspect of the present invention, There is provided a system for supporting contact reminding, including a directory management apparatus in which personal information of each of users who own contact information is stored for each piece of contact information and a contact reminding support apparatus which obtains unregistered contact information not registered with a directory database based on contact histories stored in a contact history database included in the contact reminding support apparatus, calculates contact statistics values for a predetermined, specific period using the contact histories of pieces of the obtained unregistered contact information, determines contact information that has recently been loosely connected to be recommendation contact information based on the contact statistics values of the pieces of unregistered contact information and the number of times of contacts for a recent specific period, extracts personal information of a user who owns the recommendation contact information by searching the directory management apparatus, and outputs a contact recommendation message including at least one of the extracted personal information, the recommendation contact information, and a contact statistics history related to the recommendation contact information.

The system for supporting contact reminding may further include a user terminal which sends an additional user information request signal including terminal identification information to the directory management apparatus when an additional user information request command is received through a directory management application, requests updated directory information from the directory management apparatus when a directory update notification signal is received from the directory management apparatus, receives the updated directory information, and updates previously registered terminal directory.

Furthermore, the directory management apparatus includes a directory database in which directory information of each of user terminals is stored and may obtain pieces of acquaintance identification information of the user terminal from the directory database when the additional user information request signal is received from the user terminal, may send an additional user information request message to the pieces of obtained acquaintance identification information, may receive additional user information responses from the pieces of obtained acquaintance identification information, may extract acquaintance identification information and additional user information by analyzing each of the received additional user information responses, may update directory information of the user terminal by storing the extracted additional user information in corresponding acquaintance identification information of the directory database, and may send a directory update notification signal to the user terminal.

In this case, the additional user information request message may be a message including a message of a question and answer form that requests at least one of a birthday, hobbies, an address, photos, whether schedules will be shared, and a base area or information about the URL of the directory management apparatus.

In accordance with yet another aspect of the present invention, there is provided a method of supporting, by a contact reminding support apparatus, contact reminding, including steps of (a) obtaining unregistered contact information not registered with a directory database based on contact histories stored in a contact history database included in the contact reminding support apparatus, (b) calculating contact statistics values for a predetermined, specific period using the contact histories of pieces of the obtained unregistered contact information, and (c) determining contact information that has recently been loosely connected to be recommendation contact information based on the contact statistics values of the pieces of unregistered contact information and the number of times of contacts for a recent specific period and notifying a user of the determined and recommended contact information.

The step (b) may include calculating at least one of a total number of calls, a total call time, a total number of messages transmitted and received, a total number of e-mails transmitted and received, and a combination of the total number of calls, the total call time, the total number of messages, and the total number of e-mails which have been performed between the user and the pieces of unregistered contact information for a predetermined, specific period as the contact statistics value.

The step (c) may include a step of arranging the pieces of unregistered contact information in order of a higher contact statistics value, checking contact histories of a specific number of pieces of unregistered contact information for a recent specific period that have been arranged at a higher place, and determining pieces of unregistered contact information each having the number of times of contacts less than a predetermined number to be the recommendation contact information, or obtaining pieces of unregistered contact information each having a contact statistics value equal to or higher than a predetermined value, checking contact histories of the pieces of obtained unregistered contact information for a recent specific period, and determining pieces of unregistered contact information having the number of times of contacts less than a predetermined number to be the recommendation contact information and a step of obtaining personal information of a user having the determined recommendation contact information, generating a contact recommendation message including at least one of the obtained personal information, the recommendation contact information, and a contact statistics history related to the recommendation contact information, and sending the contact recommendation message to the user terminal, or generating contact recommendation notification information including at least one of the obtained personal information, the recommendation contact information, and a contact statistics history related to the recommendation contact information and outputting the contact recommendation notification information.

In accordance with yet another aspect of the present invention, there is provided a method of supporting, by a directory management apparatus, contact reminding, including a step of obtaining pieces of acquaintance identification information of a user terminal by searching a directory database when an additional user information request signal is received from the user terminal, sending an additional user information request message to the pieces of obtained acquaintance identification information, and receiving additional user information responses, a step of extracting acquaintance identification information and additional user information by analyzing each of the received additional user information responses and updating the directory information of the user terminal by storing the extracted additional user information in corresponding acquaintance identification information of the directory database, and a step of sending a directory update notification signal to the user terminal.

The method of supporting contact reminding may further include a step of obtaining the updated directory information of the user terminal from the directory database when a directory update request signal is received from the user terminal and providing the obtained directory information.

In accordance with yet another aspect of the present invention, there is provided a method of supporting, by a user terminal, contact reminding, including a step of sending an additional user information request signal, including terminal identification information, to a directory management apparatus when an additional user information request command is received through a directory management application and a step of sending a directory update request signal to the directory management apparatus when a directory update notification signal is received from the directory management apparatus, receiving updated directory information from the directory management apparatus, and updating previously stored terminal directory.

The method of supporting contact reminding may further include a step of receiving an additional user information response when an additional user information request message is received from the directory management apparatus and sending the additional user information response to the directory management apparatus.

In accordance with yet another aspect of the present invention, there is provided a recording medium which is readable by an electronic device and on which a method of supporting contact reminding is recorded in a program form, wherein the method includes steps of (a) obtaining unregistered contact information not registered with a directory database based on contact histories stored in a contact history database, (b) calculating contact statistics values for a predetermined, specific period using the contact histories of pieces of the obtained unregistered contact information, and (c) determining contact information that has recently been loosely connected to be recommendation contact information based on the contact statistics values of the pieces of unregistered contact information and the number of times of contacts for a recent specific period and notifying a user of the determined and recommended contact information.

In accordance with yet another aspect of the present invention, there is provided a recording medium which is readable by an electronic device and on which a method of supporting contact reminding is recorded in a program form, wherein the method includes a step of obtaining pieces of acquaintance identification information of a user terminal by searching a directory database when an additional user information request signal is received from the user terminal, sending an additional user information request message to the pieces of obtained acquaintance identification information, and receiving additional user information responses, a step of extracting acquaintance identification information and additional user information by analyzing each of the received additional user information responses and updating directory information of the user terminal by storing the extracted additional user information in corresponding acquaintance identification information of the directory database, and a step of sending a directory update notification signal to the user terminal.

In accordance with yet another aspect of the present invention, there is provided a recording medium which is readable by an electronic device and on which a method of supporting contact reminding is recorded in a program form, wherein the method includes a step of sending an additional user information request signal, including terminal identification information, to a directory management apparatus when an additional user information request command is received through a directory management application and a step of sending a directory update request signal to the directory management apparatus when a directory update notification signal is received from the directory management apparatus, receiving updated directory information from the directory management apparatus, and updating previously stored terminal directory.

Advantageous Effects

In accordance with the present invention, the contact statistics value of each of pieces of unregistered contact information, not registered with a directory, for a specific period can be calculated based on a contact history, pieces of unregistered contact information that have recently been loosely connected can be extracted based on contact statistics values, and getting in touch can be recommended for a user.

Furthermore, a user terminal or a contact reminding support apparatus can recommend the contact information of loosely connected acquaintances to a user periodically or according to user setting based on the contact history of the user so that the user gets in touch with the loosely connected acquaintances.

Furthermore, a hello message can be automatically transmitted to unregistered contact information that belongs to pieces of unregistered contact information not registered with a directory database and that is loosely connected for a recent specific period.

Furthermore, additional user information, such as the birthdays, hobbies, approval for scheduling sharing, base areas, and photos of acquaintances registered with a terminal directory, can be automatically updated although a user does not directly input the birthdays, hobbies, approval for scheduling sharing, base areas, and photos.

Furthermore, information about the directory of a user terminal can be synchronized with information about the directory of a directory management apparatus.

Furthermore, inconvenience that is caused when a user makes voice calls or sends text messages to acquaintances one by one in order to notify the acquaintances of additional user information can be minimized.

DESCRIPTION OF REFERENCE NUMERALS

Figure 1:
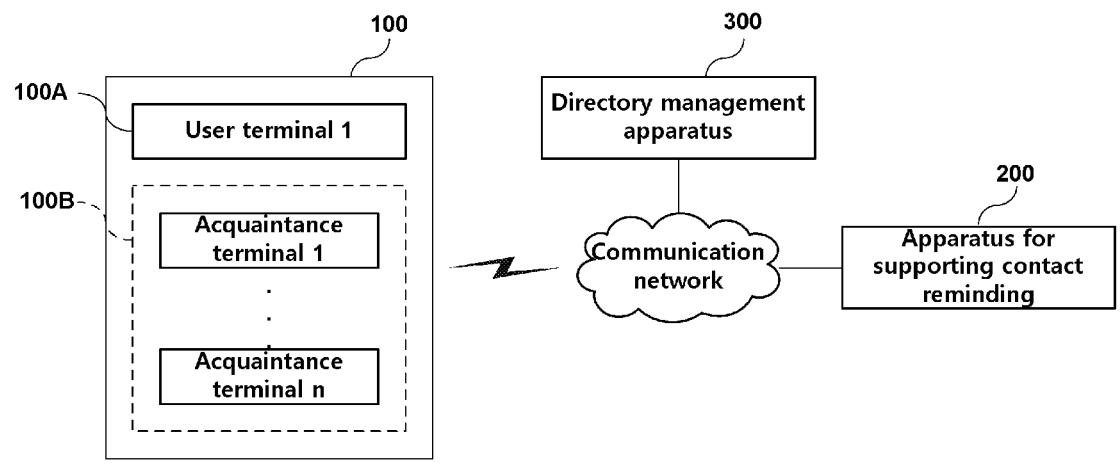
FIG. 1 is a diagram illustrating a system for supporting contact reminding in accordance with the present invention.

100: user terminal
110: communication unit
200: contact reminding support apparatus
300: directory management apparatus
120: user interface unit
130: storage unit
135: terminal directory
150: directory update unit
140: additional user information request processing unit
160: additional user information response processing unit
210: communication unit
220: database
222: directory DB
224: contact history DB
230: contact history registration unit
240: unregistered contact information acquisition unit
250: contact recommendation unit
310: communication unit
320: directory DB
330: additional user information processing unit
340: directory update processing unit
350: directory information providing unit

MODE FOR INVENTION

The details of the objects and technical constructions of the present invention and corresponding acting effects will become more clearly understood from the following detailed description based on the drawings accompanied by the specification of the present invention.

"User information" is information about a user who uses a user terminal and may include basic user information, including the telephone number of the user terminal, and additional user information, including an office telephone number, a home telephone number, a user image, an address, an e-mail address, a blog address, a birthday, hobbies, photos, whether schedules will be shared, and a base area. The user terminal may separately store the user information or may store the user information in a terminal directory or a server directory.

FIG. 1 is a diagram illustrating a system for supporting contact reminding in accordance with the present invention.

Referring to FIG. 1, the system for supporting contact reminding includes user terminals 100A, 100B (hereinafter called 100), a contact reminding support apparatus 200 which extracts unregistered contact information that is loosely connected for a recent specific period from pieces of unregistered contact information, not registered with a directory, based on a previously stored contact history and recommends the extracted unregistered contact information to the user terminal 100 so that the user terminal 100 gets in touch with the extracted unregistered contact information, and a directory management apparatus 300.

The contact reminding support apparatus 200 obtains pieces of unregistered contact information, not registered with the directory, based on contact histories stored in a database (DB) and calculates a contact statistics value for a predetermined, specific period using each of the contact histories of the obtained unregistered contact information.

Thereafter, the contact reminding support apparatus 200 extracts unregistered contact information that has a high contact statistics value, but that is loosely connected for a recent specific period and sends a contact recommendation message, including the extracted unregistered contact information, to the user terminal 100. In this case, the contact reminding support apparatus 200 extracts the personal information of the extracted unregistered contact information from the directory management apparatus 300, generates the contact recommendation message including the extracted personal information, the unregistered contact information, a contact statistics history, etc., and sends the generated contact recommendation message to the user terminal 100. In this case, the personal information may include the name, address, etc. of a user, and the contact statistics history may include contact statistics for a specific period, a contact history for a recent specific period.

Figure 2:
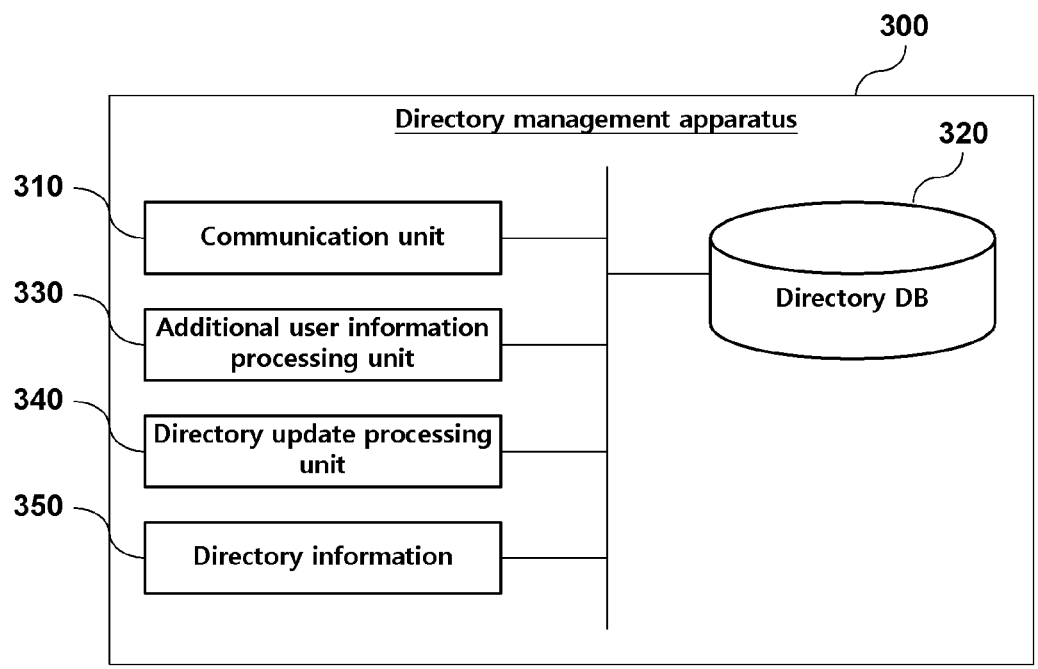
FIG. 2 is a block diagram schematically illustrating a contact reminding support apparatus in accordance with the present invention.

Reference is made to FIG. 2 with respect to a detailed description of the contact reminding support apparatus 200.

When a contact recommendation message including unregistered contact information, the personal information of a user corresponding to the unregistered contact information, and a contact statistics history for the unregistered contact information is received from the contact reminding support apparatus 200, the user terminal 100 outputs the received contact recommendation message.

For example, the user terminal 100 may output a message reading that "You are loosely connected with "Hwawoo" who has a telephone number of 010-111-1111 and please make a phone call to him~You have made 10 phone calls during July 2012 and the last call date was August 15".

Furthermore, a user who has received a contact recommendation message may register the unregistered contact information with the directory.

Furthermore, the user terminal 100 is a terminal that has a client function and that accesses the directory management apparatus 300 and the contact reminding support apparatus 200 over a communication network. The user terminal 100 includes the first user terminal 100A that requests the additional user information of acquaintances registered with the terminal directory and at least one acquaintance terminal 100B that writes a response to an additional user information request signal received from the directory management apparatus 300 and sends the response to the directory management apparatus 300.

When an additional user information request command is received through a directory management application, the first user terminal 100A sends the additional user information request signal, including terminal identification information, to the directory management apparatus 300.

Furthermore, when a directory update notification signal is received from the directory management apparatus 300, the first user terminal 100A receives updated directory information from the directory management apparatus 300 and updates a previously registered terminal directory. Accordingly, the first user terminal 100A may automatically update additional user information, such as the birthdays, hobbies, approval for scheduling sharing, base areas, and photos of acquaintances registered with the terminal directory, although a user does not directly input the birthdays, hobbies, approval for scheduling sharing, base areas, and photos.

The user terminal 100 may include any user device on which a communication function and a short-distance communication function are mounted. For example, the user terminal 100 may include various devices, such as a laptop computer, a wireless communication terminal, a smart phone, a Portable Media Player (PMP), a Personal Digital Assistant (PDA), a tablet PC, a set-top box, and smart TV.

The user terminal 100, the contact reminding support apparatus 200, and the directory management apparatus 300 are connected over a communication network. The communication network may include a short-distance communication network, a wired communication network, a wireless communication network, etc.

Although the contact reminding support apparatus 200 has been illustrated as operating as a server connected to the user terminals 100 over the communication network, the contact reminding support apparatus 200 may also be implemented as the user terminal 100. That is, since a terminal directory, a contact history, etc. are stored in the user terminal 100, the user terminal 100 may extract unregistered contact information that is loosely connected based on the contact history and recommend the extracted unregistered contact information. In such a case, the user terminal 100 may operate as the contact reminding support apparatus 200.

When an additional user information request signal is received from the directory management apparatus 300, the acquaintance terminal 100B writes an additional user information response and sends it to the directory management apparatus 300.

Figure 4:
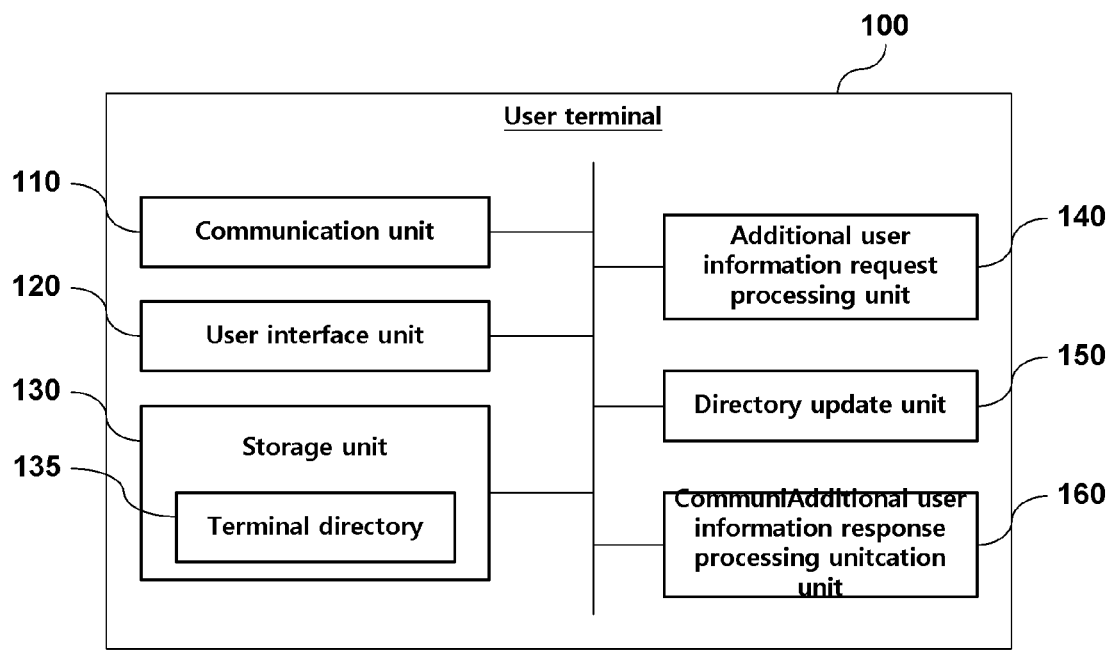
FIG. 4 is a block diagram schematically illustrating the configuration of a user terminal in accordance with the present invention.

Reference is made to FIG. 4 with respect to a detailed description of the first user terminal 100A or the acquaintance terminal 100B, that is, the user terminal 100.

The directory management apparatus 300 stores the personal information of a user who owns a telephone number by the telephone number. In this case, the personal information may include a name, an address, etc.

Furthermore, the directory management apparatus 300 is equipped with a directory DB with which the user information of acquaintances has been registered for each user terminal. In this case, the user information may include basic user information, including user terminal identification information, a telephone number, etc., and additional user information, including a birthday, hobbies, an address, a photo, whether schedules will be shared, a base area, etc.

When an additional user information request signal is received from the first user terminal 100A, the directory management apparatus 300 obtains pieces of acquaintance identification information of the first user terminal 100A from the directory DB, sends an additional user information request message based on the pieces of obtained acquaintance identification information, and receives additional user information responses. In this case, the additional user information request message may be a message of a question and answer form that requests at least one of a birthday, hobbies, an address, photos, whether a schedule will be shared, and a base area or information about the URL of the directory management apparatus 300.

Furthermore, the directory management apparatus 300 extracts acquaintance identification information and additional user information by analyzing each of received additional user information responses, updates the directory information of the first user terminal 100A by storing the extracted additional user information in corresponding acquaintance identification information of the directory DB, and sends a directory update notification signal to the first user terminal 100A.

Figure 3:
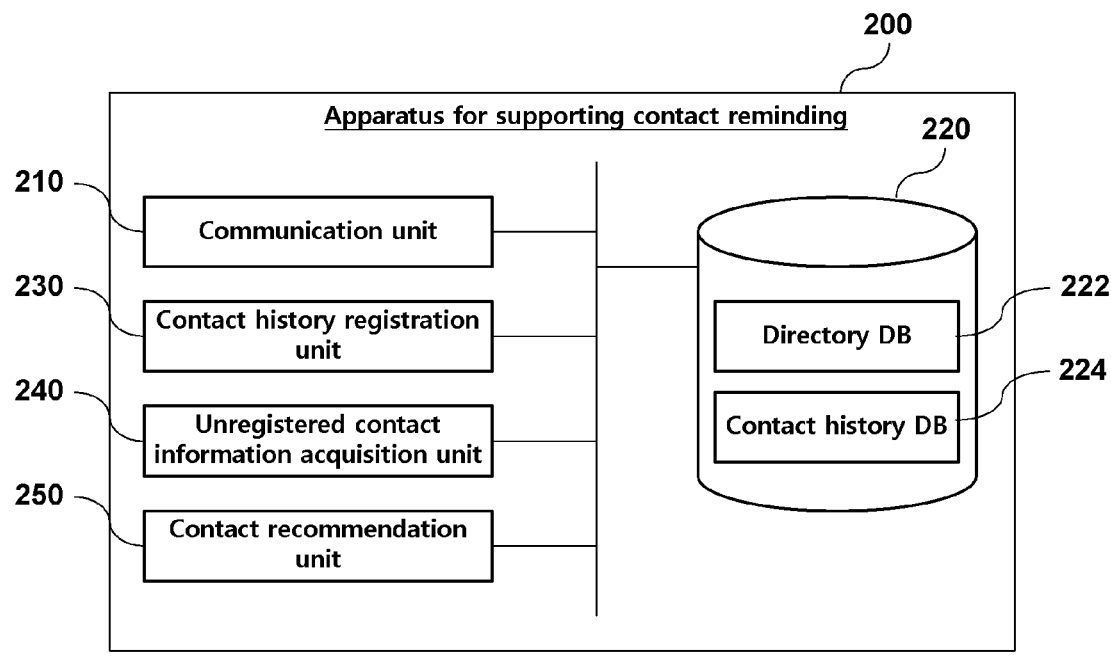
FIG. 3 is a block diagram schematically illustrating the configuration of a directory management apparatus in accordance with the present invention.

Reference is made to FIG. 3 with respect to a detailed description of the directory management apparatus 300.

FIG. 2 is a block diagram schematically illustrating the contact reminding support apparatus in accordance with the present invention.

Referring to FIG. 2, the contact reminding support apparatus 200 includes a communication unit 210 for communication over a communication network, a DB 220, an unregistered contact information acquisition unit 240, and a contact recommendation unit 250.

The DB 220 includes a directory DB 222 and a contact history DB 224.

The directory DB 222 stores user terminal identification information, telephone numbers (contact information) registered as acquaintances, etc.

The contact history DB 224 stores information about the contact history of the calls, messages, e-mails, etc. of each user. The contact history DB 224 stores the contact information of counterparts with which a user has gotten in touch with and the contact history of each of the pieces of contact information. In this case, the contact history may include a contact date, call time, the number of messages transmitted and received, the number of e-mails transmitted and received, etc.

The unregistered contact information acquisition unit 240 extracts unregistered contact information not registered with the directory DB 222 and the contact history of the corresponding unregistered contact information based on the contact history stored in the contact history DB 224. In this case, the unregistered contact information acquisition unit 240 removes contact information to be removed, such as call center contact information, cut-off contact information, blacklist contact information, and spam contact information, from pieces of the obtained unregistered contact information and extracts only pieces of unregistered contact information from which pieces of the contact information to be removed have been removed.

The contact recommendation unit 250 may calculate the contact statistics value for a predetermined, specific period using each of the contact histories of the pieces of unregistered contact information obtained from the unregistered contact information acquisition unit 240, may determine contact information that has recently been loosely connected to be recommendation contact information based on the calculated contact statistics values of the pieces of unregistered contact information and the number of times of contacts for a recent specific period, and may send or output a contact recommendation message, including the determined and recommended contact information, to a corresponding user terminal. In this case, the contact recommendation unit 250 extracts the personal information of the recommendation contact information from the directory management apparatus 300, generates a contact recommendation message including the extracted personal information, the recommendation contact information, the contact statistics history of the recommendation contact information, etc., and sends the contact recommendation message to the user terminal. In this case, the personal information may include the name, address, etc. of a user, and the contact statistics history may include contact statistics for a specific period, a contact history for a recent specific period, etc.

That is, the contact recommendation unit 250 calculates the contact statistics value using a total number of calls, a total call time, a total number of messages transmitted and received, a total number of e-mails transmitted and received, and a combination of them which have been performed between the user and each of the pieces of unregistered contact information for a predetermined, specific period.

For example, the total number of calls between the user and the pieces of unregistered contact information from January to February 2012 may be calculated as the contact statistics value. Furthermore, the total call time between the user and the pieces of unregistered contact information from January to February 2012 may be calculated as the contact statistics value. Furthermore, the total number of messages transmitted and received between the user and the pieces of unregistered contact information from January to February 2012 may be calculated as the contact statistics value. Furthermore, a combination of the total number of calls, the total number of messages transmitted and received, and the total frequency of e-mails transmitted and received between the user and the pieces of unregistered contact information from January to February 2012 may be calculated as the contact statistics value.

After the contact statistics value between the user and the unregistered contact information is calculated as described above, the contact recommendation unit 250 extracts pieces of unregistered contact information each of which has a high contact statistics value, but has the number of times of contacts less than a predetermined number for a recent specific period from the pieces of unregistered contact information, obtained from the unregistered contact information acquisition unit 240, as pieces of loosely-connected contact information. In this case, the contact recommendation unit 250 may arrange the pieces of unregistered contact information in order of a higher contact statistics value, may check the contact histories of a specific number of pieces of unregistered contact information for a recent specific period that are arranged at higher places, and may extract pieces of unregistered contact information, each having the number of times of contacts less than a predetermined number, as recent loosely-connected recommendation contact information. In this case, a higher contact statistics value may mean that contacts were frequently made in the past. Furthermore, the contact recommendation unit 250 may obtain pieces of unregistered contact information each having a contact statistics value equal to or higher than a predetermined value, may check the contact histories of the pieces of obtained unregistered contact information for a recent specific period, and may extract pieces of unregistered contact information, each having the number of times of contacts less than a predetermined number, as the recent loosely-connected recommendation contact information. In this case, the recommendation contact information means contact information with which getting in touch is recommended because the contact information was frequently connected in the past, but has recently been loosely connected.

Thereafter, the contact recommendation unit 250 extracts the personal information of a user who has extracted recommendation contact information from the directory management apparatus, generates a contact recommendation message including the extracted personal information, the recommendation contact information, a contact statistics history for the recommendation contact information, etc., and sends the contact recommendation message to a corresponding user terminal. In this case, the contact recommendation unit 250 may generate the pieces of unregistered contact information that have recently been loosely connected in a list form and send the contact recommendation message including the pieces of unregistered contact information.

Furthermore, the contact recommendation unit 250 may automatically send a hello message, previously written by a user, to the determined and recommended contact information.

The contact reminding support apparatus 200 that has been configured as described above may further include a contact history registration unit 230 for registering the contact history of a user with the contact history DB 224. In this case, the contact history registration unit 230 may receive the contact history from the user terminal and register the received contact history with the contact history DB 224.

The contact reminding support apparatus 200 that has been configured as described above has been illustrated as operating as a server, but the contact reminding support apparatus 200 may operate as a terminal.

If the contact reminding support apparatus 200 operates as a terminal, the contact recommendation unit 250 may output a contact recommendation message in the form of voice or a message.

FIG. 3 is a block diagram schematically illustrating the configuration of the directory management apparatus in accordance with the present invention.

Referring to FIG. 3, the directory management apparatus 300 includes a communication unit 310 for communication with the user terminal 100, a directory DB 320, an additional user information processing unit 330, a directory update processing unit 340, and a directory information providing unit 340.

The directory DB 320 stores information about the directories of user terminals. The directory information may include basic user information, including pieces of identification information (e.g., telephone numbers), etc. of acquaintances registered with each of the user terminals, and additional user information, including a birthday, hobbies, an address, a photo, whether schedules will be shared, a base area, etc. In this case, the additional user information may be information registered through the directory update processing unit 340.

When an additional user information request signal is received from a user terminal through the communication unit 310, the additional user information processing unit 330 obtains pieces of acquaintance identification information of the user terminal by searching the directory DB 320, sends an additional user information request message to the pieces of obtained acquaintance identification information, and receives additional user information responses. In this case, the additional user information request message may be a message of a question and answer form that requests at least one of a birthday, hobbies, an address, photos, and whether a schedule will be shared or a message including information about the URL of the directory management apparatus.

That is, the additional user information processing unit 330 may generate a question and answer message that inquires about additional user information, such as a birthday, hobbies, an address, photos, and whether a schedule will be shared, and send the question and answer message to the terminals of the acquaintances. In response thereto, each of the acquaintances who have received the question and answer message inputs a response to questions displayed in the question and answer message and sends the input response. The question and answer message may be a message of a five-question and 5-answer form, for example.

Furthermore, the additional user information processing unit 330 may generate the additional user information request message including information about the URL of a page that inquires about additional user information, such as a birthday, hobbies, an address, photos, and whether a schedule will be shared, etc., and send the additional user information request message to the terminals of the acquaintances. In response thereto, each of the acquaintances who have received the additional user information request message may access the directory management apparatus based on the information about the URL and write a response to the questions.

In accordance with another aspect of the present invention, the additional user information processing unit 330 may send the additional user information request message to all the user terminals registered with the directory DB 320 and receive the additional user information responses from the user terminals. That is, although an additional user information request signal is not received from a user terminal, the additional user information processing unit 330 may request additional user information from user terminals registered with the directory DB 320, may receive the additional user information from the user terminals, and may update directory information.

The directory update processing unit 340 updates the user information of acquaintances who have sent the additional user information responses and sends a directory update notification signal to the user terminals. In this case, the directory update processing unit 340 may send the directory update notification signal to the user terminals using a push system or may send text or a voice message when a push system is not applied.

That is, when the response to the question and answer message that requests the additional user information is received, the directory update processing unit 340 extracts terminal identification information, the additional user information, etc. by analyzing the additional user information response. Thereafter, the directory update processing unit 340 updates the extracted additional user information in a directory corresponding to the terminal identification information and sends the directory update notification signal to the user terminal.

Furthermore, when the additional user information is received through the information about the URL, the directory update processing unit 340 updates the additional user information and sends the directory update notification signal to the user terminal. The case where the additional user information has been input through the information about the URL may be a case where a corresponding user has updated user information in its own directory.

In accordance with another aspect of the present invention, the directory update processing unit 340 may extract other user terminals in which acquaintances whose additional user information has been updated have been registered as acquaintances by searching the directory DB 320 and send the directory update notification signal to the extracted other user terminals.

When the directory update request signal is received from a user terminal through the communication unit 310, the directory information providing unit 340 obtains the directory information of the user terminal from the directory DB 320 and provides the obtained directory information.

FIG. 4 is a block diagram schematically illustrating the configuration of the user terminal in accordance with the present invention. The user terminal 100 illustrated in FIG. 4 may generally refer to the first user terminal 100A and the acquaintance terminal 100B.

Referring to FIG. 4, the user terminal 100 includes a communication unit 110 for communication with the directory management apparatus, a user interface unit 120, a storage unit 130 in which a terminal directory 135 is stored, an additional user information request processing unit 140, a directory update unit 150, and an additional user information response processing unit 160.

The communication unit 110 is communication means that interconnects the user terminal 100, the directory management apparatus, and the contact reminding support apparatus over a communication network. For example, the communication unit 110 may include a wireless communication module, such as mobile communication and satellite communication, a wired communication module, such as the Internet, and a short-distance wireless communication module, such as Wi-Fi.

The user interface unit 120 may function as an input unit that receives user commands or an output unit that outputs results according to the user commands.

The user interface unit 120 is means for receiving user requests for controlling the operations of the user terminal 100 and converts a request from a user into an electrical signal in response to a user manipulation.

The user interface unit 120 may include key input means for receiving alphabetical, numerical, and text information from a user, voice recognition means for receiving voice or audio signals from a user through a microphone, etc., image acquisition means for obtaining images by photographing a specific object, such as a camera, an RFID reader, a code reader, etc. The key input means may be implemented using a keyboard, a keypad, a touch screen, etc.

The user interface unit 120 may perform display processing through display means for displaying screen information according to the driving of an application, for example, a Liquid Crystal Display (LCD) or Organic Light Emitting Diodes (OLED).

The storage unit 130 stores programs required to control the operations of the user terminal 100 and data generated when the programs are executed. The storage unit 130 is equipped with the terminal directory 135 for storing user information about acquaintances.

When an additional user information request command is received through a directory management application, the additional user information request processing unit 140 sends an additional user information request signal, including terminal identification information, to the directory management apparatus. That is, when a user executes the directory management application stored in the storage unit 130 and then selects the additional user information request command, the additional user information request processing unit 140 sends the additional user information request signal, including the terminal identification information, to the directory management apparatus.

When a directory update notification signal is received from the directory management apparatus, the directory update unit 150 sends a directory update request signal to the directory management apparatus, receives updated directory information from the directory management apparatus, and updates the terminal directory 135 stored in the storage unit 130. In this case, a user is notified of the reception of the directory update notification signal through various methods, such as a widget, an indicator, pop-up, vibration, and voice. Accordingly, the additional user information of acquaintances registered with the terminal directory 135, such as birthdays, hobbies, approval for scheduling sharing, base areas, and photos, can be automatically updated although a user does not directly input the additional user information of the acquaintances.

When an additional user information request message is received from the directory management apparatus through the communication unit 110, the additional user information response processing unit 160 receives an additional user information response through the user interface unit 120 and sends the additional user information response to the directory management apparatus. In this case, if the additional user information request message is a message of a question and answer form, the user information response processing unit 160 receives a response to questions through the user interface unit 120 and sends the response to the directory management apparatus.

Furthermore, if the additional user information request message includes information about the URL of the directory management apparatus, the additional user information response processing unit 160 may access the directory management apparatus through the information about the URL and write a response to questions. That is, when the directory management apparatus is accessed through the information about the URL, the additional user information response processing unit 160 displays a field for inputting additional user information, receives the additional user information through the user interface unit 120, and sends the additional user information to the directory management apparatus.

Figure 5:
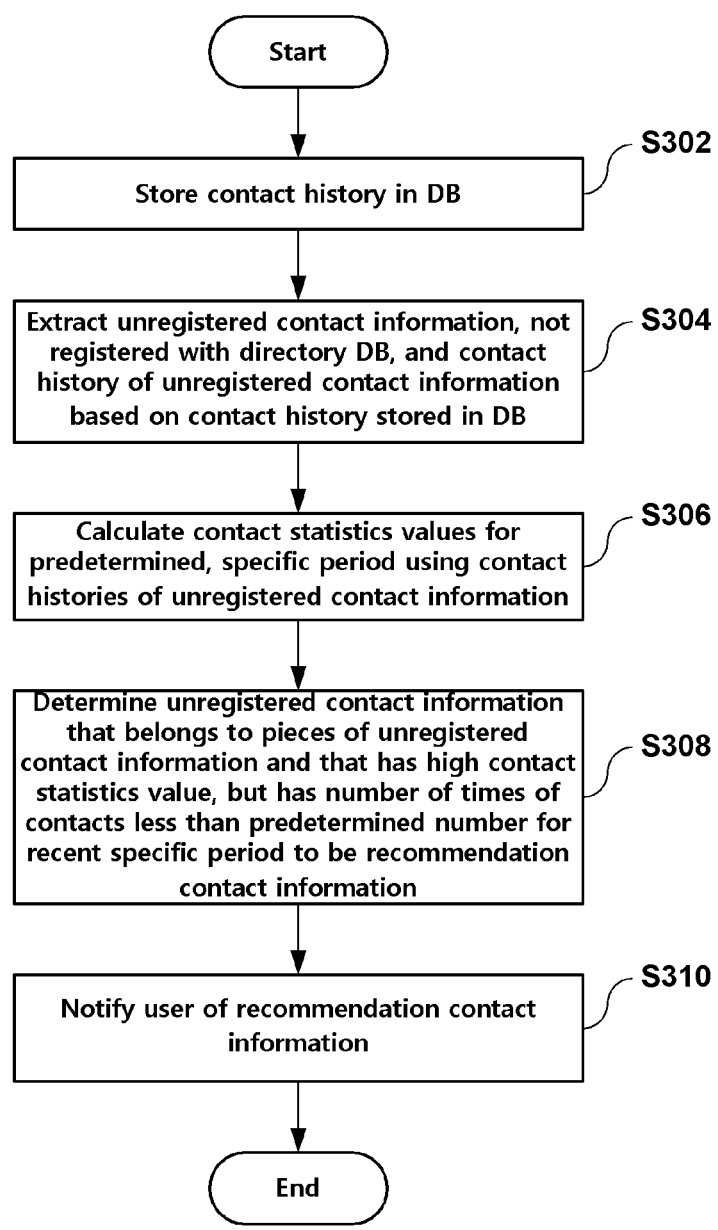
FIG. 5 is a flowchart illustrating a method of supporting contact reminding in accordance with a first embodiment of the present invention.

FIG. 5 is a flowchart illustrating a method of supporting contact reminding in accordance with a first embodiment of the present invention.

Referring to FIG. 5, the contact reminding support apparatus stores the contact history of a user in the DB (S302). In this case, the contact history includes call time, the number of calls, the number of messages transmitted and received, the number of e-mails transmitted and received, etc. which have been performed between the user and counterparts.

After executing step S302, the contact reminding support apparatus extracts unregistered contact information, not registered with the directory DB, and the contact history of the unregistered contact information based on the contact history stored in the DB (S304). In this case, the contact reminding support apparatus removes contact information corresponding to a call center telephone number of a form, such as "15xx-xxxx", contact information registered as a cut-off telephone number, contact information registered as a blacklist telephone number, etc. from pieces of the obtained unregistered contact information.

After executing step S304, the contact reminding support apparatus calculates contact statistics values for a predetermined, specific period using the contact histories of the pieces of unregistered contact information (S306). In this case, the contact statistics value includes a total call time, a total number of calls, a total number of messages transmitted and received, a total number of e-mails transmitted and received, etc. Accordingly, the contact reminding support apparatus calculates a total number of calls, a total call time, a total number of messages transmitted and received, a total number of e-mails transmitted and received, etc. for a predetermined, specific period which have been performed between the user and each of the pieces of unregistered contact information. Furthermore, the contact reminding support apparatus may calculate the sum of a total number of calls, a total call time, a total number of messages transmitted and received, and a total number of e-mails transmitted and received calculated for each of the pieces of unregistered contact information as the contact statistics value.

After executing step S306, the contact reminding support apparatus determines unregistered contact information that belongs to the pieces of unregistered contact information and that has a high contact statistics value, but has the number of times of contacts less than a predetermined number for a recent specific period to be recommendation contact information (S308). The recommendation contact information means contact information with which getting in touch is recommended because the contact information was frequently connected in the past, but has recently been loosely connected.

After executing step S308, the contact reminding support apparatus notifies the user of the recommendation contact information so that the user gets in touch with the determined and recommended contact information (S310). In this case, if the contact reminding support apparatus operates as a server, the contact reminding support apparatus may extract the personal information of a user, corresponding to the determined and recommended contact information, from the directory management apparatus, may generate a contact recommendation message including the extracted personal information, the recommendation contact information, a contact statistics history, etc., and may send the contact recommendation message to the user terminal. Furthermore, if the contact reminding support apparatus operates as a user terminal, the contact reminding support apparatus may extract the personal information of a user, corresponding to the determined and recommended contact information, from the directory management apparatus and output contact recommendation notification information including the extracted personal information, the recommendation contact information, a contact statistics history, etc. In this case, the user terminal may output the contact recommendation notification information in various ways, such as voice or a message.

Figure 6:
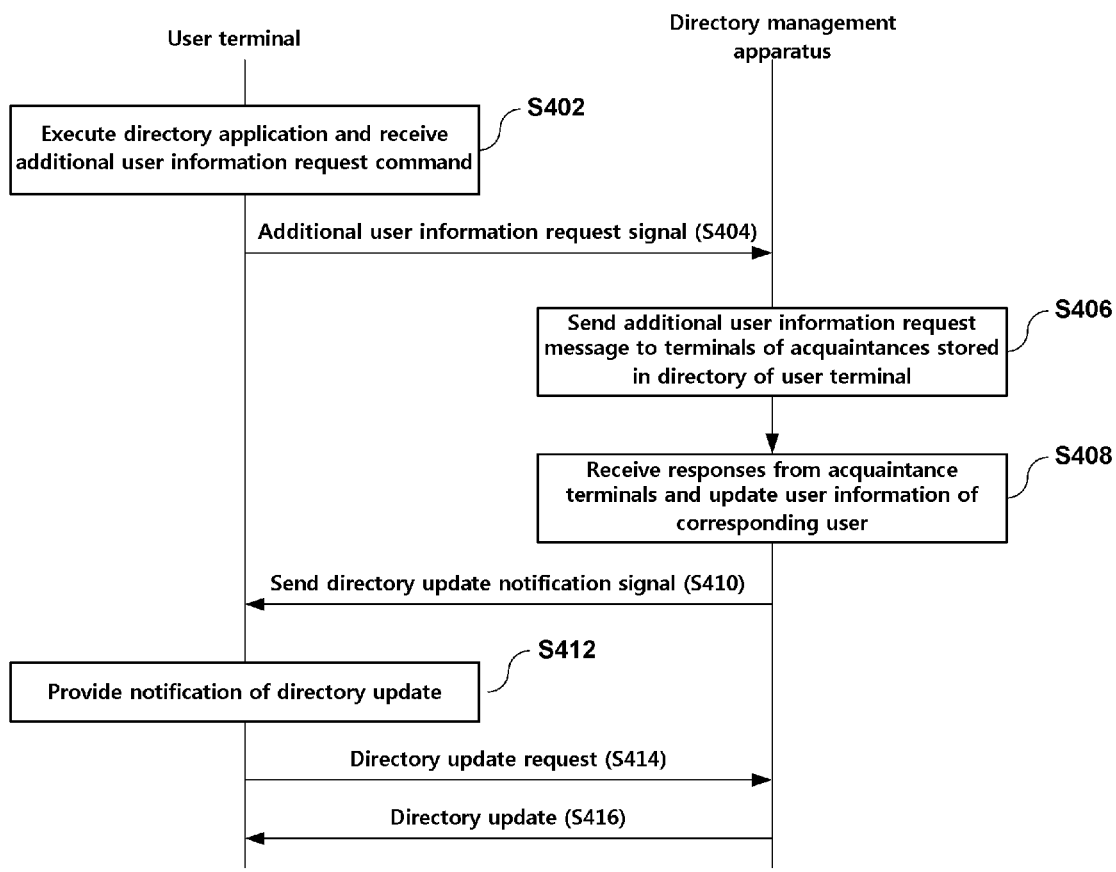
FIG. 6 is a diagram illustrating a method of supporting contact reminding in accordance with the second embodiment of the present invention.

FIG. 6 is a diagram illustrating a method of supporting contact reminding in accordance with the second embodiment of the present invention.

Referring to FIG. 6, when an additional user information request command is received through the directory management application (S402), the user terminal sends an additional user information request signal, including user terminal identification information, to the directory management apparatus (S404).

The directory management apparatus obtains pieces of acquaintance identification information of the user terminal from the directory DB and sends an additional user information request message to the pieces of obtained acquaintance identification information (S406). The acquaintances who have received the additional user information request message inputs additional user information. The terminals of the acquaintances send additional user information responses, each including the input additional user information, to the directory management apparatus.

In response thereto, the directory management apparatus extracts the acquaintance identification information and the additional user information by analyzing each of the additional user information responses received from the terminals of the acquaintances and updates the directory information of the user terminals by storing the extracted additional user information in the corresponding acquaintance identification information of the directory DB (S408).

After executing step S408, the directory management apparatus sends a directory update notification signal to the user terminal (S410). In this case, the directory management apparatus may extract other user terminals in which acquaintances whose additional user information has been updated have been registered as acquaintances and may send the directory update notification signal to the extracted other user terminals.

After step S410 is executed, the user terminal outputs directory update notification (S412). If a directory update request is received from a user, the user terminal sends a directory update request signal to the directory management apparatus (S414). The user terminal may output the directory update notification using a method, such as a widget, an indicator, pop-up, vibration, or voice.

After step S414 is executed, the directory management apparatus provides the user terminal with updated directory information (S416).

The additional user information, such as the birthdays, hobbies, approval for scheduling sharing, base areas, and photos of acquaintances registered with the terminal directory, can be automatically updated through such a method although the user does not directly input the additional user information.

Figure 7:
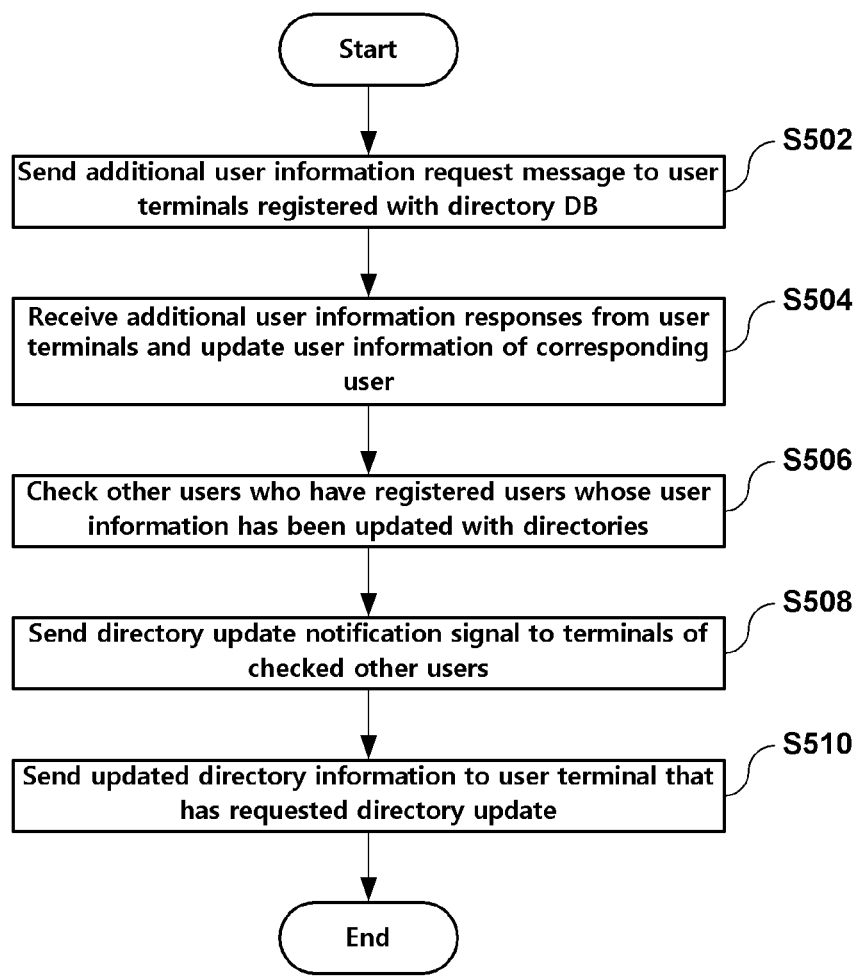
FIG. 7 is a flowchart illustrating a method of supporting contact reminding in accordance with the third embodiment of the present invention.

FIG. 7 is a flowchart illustrating a method of supporting contact reminding in accordance with the third embodiment of the present invention.

Referring to FIG. 7, the directory management apparatus sends an additional user information request message to user terminals registered with the directory DB (S502).

Users who have received the additional user information request message input additional user information. The user terminals send input additional user information responses to the directory management apparatus.

The directory management apparatus receives the additional user information responses from the user terminals, analyzes the received additional user information responses, and updates the user information of a corresponding user (S504). That is, the directory management apparatus extracts user identification information and the additional user information by analyzing each of the received additional user information responses and updates the user information of a corresponding user by storing the extracted additional user information in the corresponding user identification information of the directory DB.

In response thereto, the directory management apparatus checks other users who have registered a user whose user information has been updated as an acquaintance by searching the directory DB (S506) and sends a directory update notification signal to the terminals of the checked other users (S508). The users who have received the directory update notification signal may send directory update request signals to the directory management apparatus.

In response thereto, the directory management apparatus sends the updated directory information to the user terminals that have requested the directory update (S510).

Meanwhile, in accordance with another aspect of the present invention, there is provided a recording medium which is readable by an electronic device and on which a method of supporting contact reminding has been recorded in a program form, the method including steps of (a) obtaining unregistered contact information not registered with the directory DB based on contact histories stored in the contact history DB, (b) calculating a contact statistics value for a predetermined, specific period using each of the contact histories of the obtained unregistered contact information, and (c) determining contact information that has recently been loosely connected to be recommendation contact information based on the calculated contact statistics values of the pieces of unregistered contact information and the number of times of contacts for a recent specific period and notifying a user of the determined and recommended contact information.

Furthermore, in accordance with another aspect of the present invention, there is provided a recording medium which is readable by an electronic device and on which a method of supporting contact reminding has been recorded in a program form, the method including steps of obtaining pieces of acquaintance identification information of a user terminal by searching the directory DB when an additional user information request signal is received from the user terminal, sending an additional user information request message to the pieces of obtained acquaintance identification information, receiving additional user information responses, extracting acquaintance identification information and additional user information by analyzing each of the received additional user information responses, updating the directory information of the user terminal by storing the extracted additional user information in corresponding acquaintance identification information of the directory DB, and sending a directory update notification signal to the user terminal.

Furthermore, in accordance with yet another aspect of the present invention, there is provided a recording medium which is readable by an electronic device and on which a method of supporting contact reminding has been recorded in a program form, the method including steps of sending an additional user information request signal, including terminal identification information, to the directory management apparatus when an additional user information request command is received through the directory management application, sending a directory update request signal to the directory management apparatus when a directory update notification signal is received from the directory management apparatus, receiving updated directory information from the directory management apparatus, and updating previously stored terminal directory.

Such a method of supporting contact reminding may be written in a program form. Codes and code segments that form the program may be easily reasoned by a programmer to which the present invention pertains. Furthermore, a program regarding the method of supporting contact reminding may be stored in readable media readable by an electronic device and may be read and executed by the electronic device.

As described above, those skilled in the art to which the present invention pertains will understand that the present invention may be implemented in other various forms without departing from the technical spirit or essential characteristics of the present invention. Accordingly, the aforementioned embodiments should not be construed as being limitative, but should be construed as being only illustrative from all aspects. Furthermore, the scope of the present invention is defined by the appended claims rather than by the detailed description. It should be understood that all modifications or variations derived from the meanings and scope of the present invention and equivalents thereof are included in the scope of the present invention.

INDUSTRIAL APPLICABILITY

The present invention may be applied to a system and method for supporting contact reminding, wherein the contact statistics values of pieces of unregistered contact information, not registered with a directory, for a specific period may be calculated based on contact histories, pieces of contact information that have recently been loosely connected may be extracted based on the contact statistics values, getting in touch may be recommended for a user, and a hello message may be automatically sent to unregistered contact information that belongs to pieces of unregistered contact information not registered with a directory DB and that is loosely connected for a recent specific period.

The invention claimed is:

1. A user terminal, comprising:
a communication unit for communication with a directory management apparatus;
a user interface device;
a processor;
a memory storing instructions thereon, the instructions when executed by the processor cause the processor to:
store a terminal directory;
send an additional user information request signal comprising terminal identification information to the directory management apparatus when an additional user information request command is received through a directory management application;
receiving a directory update notification signal from the directory management apparatus responsive to sending the additional user information request signal;
send a directory update request signal to the directory management apparatus responsive to receiving the directory update notification signal from the directory management apparatus;
receive updated directory information from the directory management apparatus;
update the terminal directory according to the updated directory information;
receive an additional user information response through the user interface device responsive to receiving an additional user information request message from the directory management apparatus through the communication unit, wherein the additional user information request message comprises information about a URL of the directory management apparatus for a user of the user terminal to respond with additional information on at least one of birthday, hobbies, address, a photo, schedule to be shared or a base area of the user; and
send the additional user information by at least accessing the URL of the directory management apparatus responsive to receiving the additional user information request.

2. A system for supporting contact reminding, comprising:
a directory management apparatus in which personal information of each of users who own contact information is stored for each piece of contact information; and
a contact reminding support apparatus which obtains unregistered contact information not registered with a directory database based on contact histories stored in a contact history database included in the contact reminding support apparatus, calculates contact statistics values for a predetermined, specific period using contact histories of pieces of the obtained unregistered contact information, determines contact information that has recently been loosely connected to be recommendation contact information based on the contact statistics values of the pieces of unregistered contact information and a number of times of contacts for a recent specific period, extracts personal information of a user who owns the recommendation contact information by searching the directory management apparatus, and outputs a contact recommendation message comprising at least one of the extracted personal information, the recommendation contact information, and a contact statistics history related to the recommendation contact information.

3. The system of claim 2, further comprising a user terminal which sends an additional user information request signal comprising terminal identification information to the directory management apparatus when an additional user information request command is received through a directory management application, requests updated directory information from the directory management apparatus when a directory update notification signal is received from the directory management apparatus, receives the updated directory information, and updates previously registered terminal directory,
wherein the directory management apparatus comprises a directory database in which directory information of each of user terminals is stored, obtains pieces of acquaintance identification information of the user terminal from the directory database when the additional user information request signal is received from the user terminal, sends an additional user information request message, comprising at least one of a message of a question and answer form that requests at least one of a birthday, hobbies, an address, photos, whether schedules will be shared, and a base area and information about a Uniform Resource Locator (URL) of the directory management apparatus, to the pieces of obtained acquaintance identification information, receives additional user information responses from the pieces of obtained acquaintance identification information, extracts acquaintance identification information and additional user information by analyzing each of the received additional user information responses, updates directory information of the user terminal by storing the extracted additional user information in corresponding acquaintance identification information of the directory database, and sends a directory update notification signal to the user terminal.

4. The system of claim 2, wherein the contact reminding support apparatus stores pieces of user identification information and contact history information comprising at least one of contact information of each of counterparts who have gotten in touch with each of the pieces of user identification information, a contact date, call time, a number of messages transmitted and received, and a number of e-mails transmitted and received with each of the pieces of the contact information.

5. The system of claim 2, wherein the contact reminding support apparatus removes unregistered contact information, corresponding to at least one of call center contact information, cut-off contact information, blacklist contact information, and spam contact information, from the pieces of obtained unregistered contact information and obtains pieces of remaining unregistered contact information.

6. The system of claim 2, wherein the contact reminding support apparatus calculates at least one of a total number of calls, a total call time, a total number of messages transmitted and received, a total number of e-mails transmitted and received, and a combination of the total number of calls, the total call time, the total number of messages, and the total number of e-mails which have been performed between the user and each of the pieces of unregistered contact information for a predetermined, specific period, as the contact statistics value.

7. The system of claim 2, wherein the contact reminding support apparatus arranges the pieces of unregistered contact information in order of a higher contact statistics value, checks contact histories of a specific number of pieces of unregistered contact information for a recent specific period that have been arranged at a higher place, and determines pieces of unregistered contact information each having a number of times of contacts less than a predetermined number to be the recommendation contact information, or obtains pieces of unregistered contact information each having a contact statistics value equal to or higher than a predetermined value, checks contact histories of the pieces of obtained unregistered contact information for a recent specific period, and determines pieces of unregistered contact information having a number of times of contacts less than a predetermined number to be the recommendation contact information.

8. The system of claim 2, wherein the contact reminding support apparatus obtains personal information of a user of the recommendation contact information from the directory management apparatus, generates a contact recommendation message comprising at least one of the obtained personal information, the recommendation contact information, and a contact statistics history related to the recommendation contact information, and sends the contact recommendation message to a user terminal, or generates contact recommendation notification information comprising at least one of the obtained personal information, the recommendation contact information, and a contact statistics history related to the recommendation contact information and outputs the contact recommendation notification information.

9. A method of supporting, by a directory management apparatus, contact reminding, the method comprising steps of:
   obtaining pieces of acquaintance identification information of a user terminal by searching a directory database when an additional user information request signal is received from the user terminal
   sending additional user information request messages to acquaintances based on the pieces of obtained acquaintance identification, wherein the additional user information request message comprises information about a URL of the directory management apparatus for the acquaintance to respond with additional information on at least one of birthday, hobbies, address, a photo, schedule to be shared or a base area of each of the acquaintances
   receiving additional user information responses from the acquaintances as responses to the additional user information request messages;
   extracting acquaintance identification information and the additional user information by analyzing the received additional user information responses;
   updating directory information of the user terminal by storing the extracted additional user information in corresponding acquaintance identification information of the directory database; and
   sending the updated directory information of the user terminal to the user terminal.

* * * * *